(12) United States Patent
Lee

(10) Patent No.: US 7,043,236 B2
(45) Date of Patent: May 9, 2006

(54) RF DETECTION AND SWITCHING SYSTEM AND METHOD

(75) Inventor: Jay Lee, Whitby (CA)

(73) Assignee: PCT Technologies, Inc., Ontario (CA)

( * ) Notice: Subject to any disclaimer, the term of this patent is extended or adjusted under 35 U.S.C. 154(b) by 559 days.

(21) Appl. No.: 10/158,075

(22) Filed: May 31, 2002

(65) Prior Publication Data

US 2004/0198341 A1 Oct. 7, 2004

(51) Int. Cl.
*H04Q 7/20* (2006.01)
*H04B 17/00* (2006.01)

(52) U.S. Cl. .................................. 455/424; 455/67.11

(58) Field of Classification Search ................. 455/423, 455/424, 425, 67.11, 127.1, 127.2, 127.3, 455/226.1, 226.2, 232.1, 234.1, 8, 63.1; 330/51, 330/127, 133, 297
See application file for complete search history.

(56) References Cited

U.S. PATENT DOCUMENTS 3,882,456 A * 5/1975 Takada ......................... 455/8
6,064,260 A * 5/2000 Montgomery et al. ...... 330/127
6,292,677 B1 * 9/2001 Hagen ......................... 455/424
6,313,698 B1 * 11/2001 Zhang et al. .................. 330/51
6,532,357 B1 * 3/2003 Ichikawa ................. 455/127.3
6,804,502 B1 * 10/2004 Burgener et al. ........... 455/425

OTHER PUBLICATIONS

Publication "RF Signal Protection Switches, " ADC Telecommunications, Inc., Aug. 2001.

* cited by examiner

*Primary Examiner*—Quochien B. Vuong
(74) *Attorney, Agent, or Firm*—Blank Rome LLP

(57) ABSTRACT

An RF signal detection and switching system is disclosed. The system includes an output common line, an output primary line, and an output secondary line. The system also includes a first switch that interconnects the output primary line with the output common line when the switch is in a first switching state. The first switch also interconnects the output primary line with a first load when it is in a second switching state. The system further includes a second switch that interconnect the output secondary line with a second load when the switch is in a first switching state. The second switch also interconnects the output secondary line with the output common line when the it is in a second switching state. An analogous system is also disclosed for input lines.

21 Claims, 2 Drawing Sheets

RF DETECTION AND SWITCHING SYSTEM AND METHOD

BACKGROUND OF THE INVENTION

1. Field of the Invention

The present invention relates to radio frequency ("RF") systems. More particularly, the present invention relates to the detection of RF signals to control an RF signal switching mechanism.

2. Description of the Prior Art

Conventional RF systems consist of a number of components (e.g., amplifiers, filters, etc.) connected in cascade. If any one component along the connection malfunctions, the entire system also malfunctions.

A redundant RF system may be defined as two identical cascade connections of RF components. One such connection may replace the other in the event that one of the components malfunctions. The time that transpires in between the malfunctioning event and the replacement of the connection is crucial for communications applications. That is, the time that it takes a system to recognize a malfunction and then replace the connection may simply be too long to be acceptable by communication standards and/or user requirements. Therefore, there is a need in the art for an RF switching system that can switch in a redundant connection in an efficient and flexible manner.

SUMMARY AND OBJECTS OF THE INVENTION

An object of the present invention is to provide a system that ensures continuous communication of an input signal even if one of the components along that signal's path malfunctions. A second object of the invention is to provide an RF signal switching system having parameters that may be adjusted by a user. A third object of the invention is to provide a switching system that quickly switches in a secondary RF system after sensing a signal level drop in a line.

The present invention performs a synonymous switching function on an RF signal at an "input common line," between an "input primary line" and an "input secondary line." This particular configuration allows redundancy to be achieved with a minimum amount of RF signal loss. The present invention may also perform the switching function on an RF signal (may be the same as the RF signal at the input common line) at an "output common line," between an "output primary line" and an "output secondary line." The switching function takes place when the RF signal power level drops below a user specified threshold level. The RF signal power level may be measured by an RF detector circuit.

Logic circuitry receives the output from the RF detector circuit and the user defined threshold level. Accordingly, the logic circuitry controls the switching circuitry based on the received information. The logic circuitry also controls switch status notification through means of a contact closure and a LED. Further, it controls a display which indicates the RF level and the threshold level.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
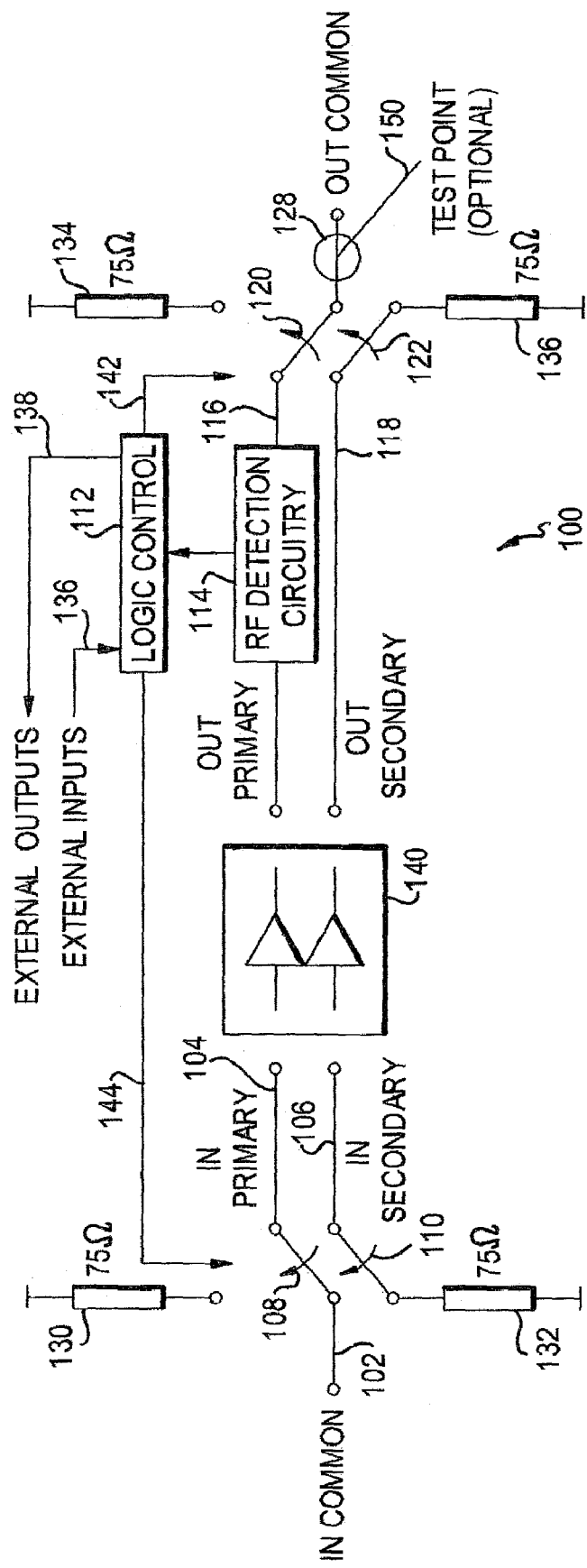
FIG. 1 is a diagram showing a first embodiment of the switching system of the present invention.

Referring now to the drawings in which like elements are shown by like reference numerals, FIG. 1 illustrates a first embodiment of the RF signal detector/switching system 100 of the present invention. The system 100 includes an input common line 102; an input primary line 104; an input secondary line 106; switches 120, 122, 108, and 110; loads 130, 132, 134, and 136; an output common line 128; an output primary line 116; an output secondary line 118; RF detection circuitry 114; and control logic 112.

The input common line 102 may be a conventional transmission line carrying an information signal ("the RF signal") that is a modulated RF carrier. When the switch 108 is in a first state (e.g., either open or closed), the switch 108 connects the input common line 102 with the input primary line 104, so that the RF signal is transmitted from the input common line 102 to the input primary line 104.

The switch 110, when in a first state, connects a load 132 to the input secondary line 106. Thus, the RF signal is not input to the input secondary line 106 when the switch 110 is in the first state.

Both switches 108 and 110 change to a second state when a control signal 144 is received from the control logic 112. Once the switches 108 and 110 change to their respective second states, the input primary line 104 is connected to load 130 via the switch 108 and the input common line 102 is connected to the input secondary line 106 via the switch 110. The RF signal is transmitted from the input common line 102 to the input secondary line 106. The input primary and secondary lines may be connected, for example, to the input of a redundant RF system 140.

The output common line 128 may include an access section (e.g., a connector) that may be used as a test point. The output common line 128 may be a conventional transmission line carrying an information signal that is a modulated RF carrier. That signal may be the same as the RF signal present at the input common line 102, a signal resulting from the processing of RF signal, or any other RF signal. For simplicity's sake, the rest of the application also refers to the signal at the output common line 128 as the RF signal.

When the switch 120 is in a first state, it connects the output common line 128 with the output primary line 116. The switch 122, when in a first state, connects a load 136 to the output secondary line 118.

Both switches 120 and 122 change to a second state when a control signal 142 is received from the control logic 112. Once the switches 120 and 122 change to their respective second states, the output primary line 116 is connected to load 134 via the switch 120 and the output common line 128 is connected to the output secondary line 118 via the switch 122. The output primary and secondary lines may be connected, for example, to the output of the redundant RF system 140.

As mentioned above, the control logic 112 outputs two control signals that change the states of the switches in the system 100. The states may be changed when the control logic 112 determines that a detected RF signal level has fallen below a threshold level. The control logic may receive the RF signal level information from an RF detection circuit 114. The RF detection circuit may measure the RF power/signal level of the output primary line 116 and pass the power level information on to the control logic 112. The control logic may compare the threshold level with the measured level to determine a drop in the measured level, and thus, send signals 144 and 142 to change the states of the switches 108, 110, 120, or 122.

The threshold level may be set by a user. The threshold level information may be input to the control logic 112 line 136. The control logic 112 may send a signal 138 to a LED indicator (not shown) in order to display the RF power level information to the user.

Figure 2:
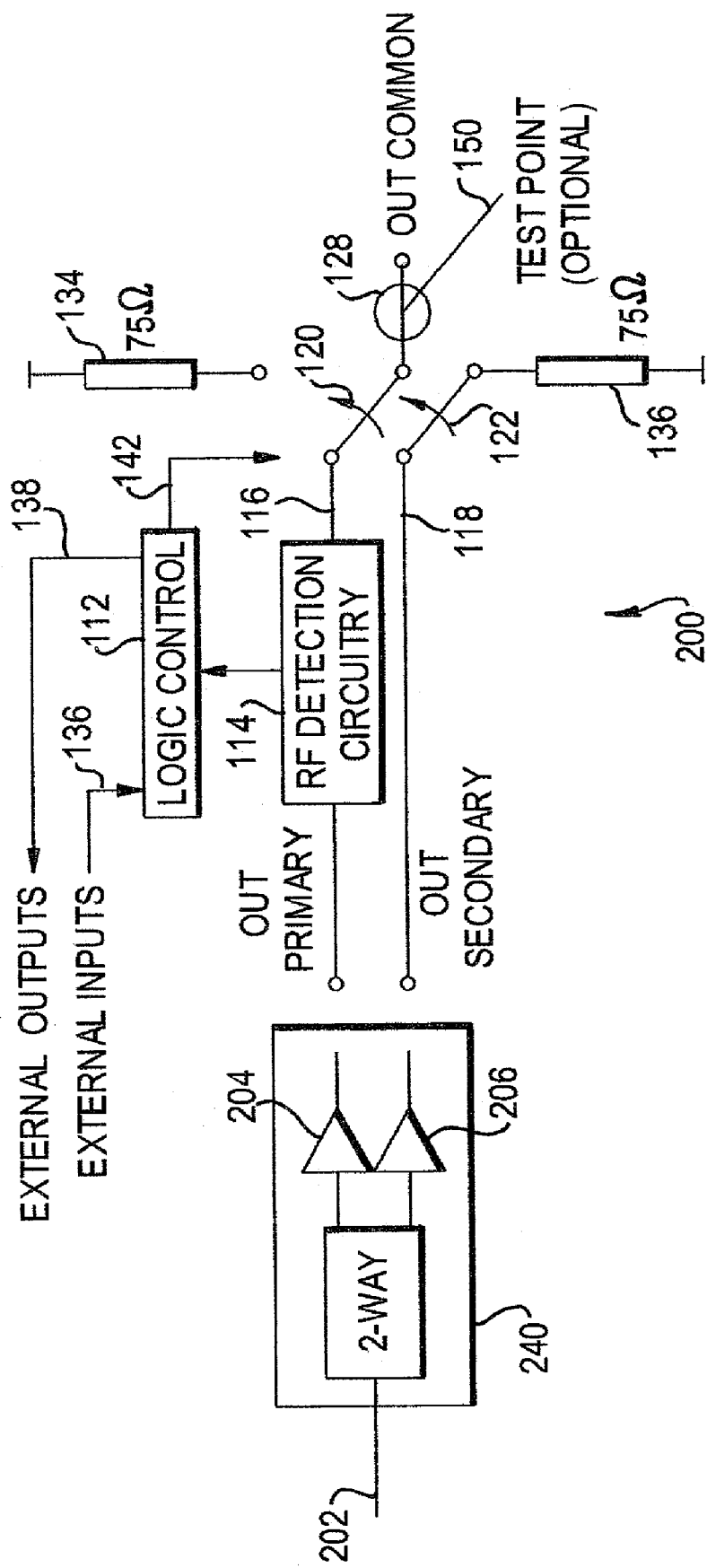
FIG. 2 is a diagram showing a first embodiment of the switching system of the present invention.

FIG. 2 illustrates a second embodiment of the present invention. The system 200 illustrated in FIG. 2 includes the elements of the system 100 that relate to the output lines 128, 116, and 118. An effective switching system that enables switching from one RF cascade of elements to a duplicate cascade of elements is achieved by use of a single pair of switches 120 and 122, resulting in continuous transmission of the RF signal through the system 200.

For example, the first cascade of elements may simply be a single amplifier 204. Likewise, the second cascade may simply be a single amplifier 206. Both cascades may be part of the redundant system 240, having a single input 202. If either of the two amplifiers malfunctions, the output of the other may be connected to the output common line 128 by controlling the states of the switches 120 and 122 as explained above.

While this invention has been described in conjunction with the specific embodiments outlined above, it is evident that many alternatives, modifications and variations are apparent to those skilled in the art. Accordingly, the preferred embodiments of the invention as set forth above are intended to be illustrative and not limiting. Various changes may be made without departing from the spirit and scope of the invention.

What is claimed is:

1. An RF signal switching system, comprising:
   an output common line;
   an output primary line;
   an output secondary line;
   a first switch for interconnecting the output primary line with the output common line when the first switch is in a first switching state, and for interconnecting the output primary line with a first load when the first switch is in a second switching state; and
   a second switch for interconnecting the output secondary line with a second load when the second switch is in a first switching state, and for interconnecting the output secondary line with the output common line when the second switch is in a second switching state.

2. The system of claim 1, wherein the output common line includes an access section that serves as a test point.

3. The system of claim 1, further comprising:
   a control system for setting the switching states of the first and second switches according to a drop in RF signal level.

4. The system of claim 3, further comprising:
   an RF detector for detecting the RF signal level.

5. The system of claim 3, wherein the control system includes an input for receiving a threshold signal level.

6. The system of claim 5, wherein the control system includes a comparator for comparing the threshold signal level with the RF signal level and determining whether a drop in the RF signal level with respect to the threshold level has occurred.

7. The system of claim 4, wherein the RF detector is tapped to the output primary line.

8. The system of claim 1, wherein the output primary line and the output secondary line are connected to an RF system.

9. The system of claim 1, further comprising:
   an input common line;
   an input primary line;
   an input secondary line;
   a third switch for interconnecting the input primary line with the input common line when the third switch is in a first switching state, and for interconnecting the input primary line with a third load when the third switch is in a second switching state; and
   a fourth switch for interconnecting the input secondary line with a fourth load when the fourth switch is in a first switching state, and for interconnecting the input secondary line with the input common line when the fourth switch is in a second switching state.

10. The system of claim 9, further comprising:
    a control system for setting the switching states of the first, second, third, and fourth switches according to a drop in RF signal level.

11. The system of claim 10, further comprising:
    an RF detector for detecting the RF signal level.

12. The system of claim 10, wherein the control system includes an input for receiving a threshold signal level.

13. The system of claim 12, wherein the control system includes a comparator for comparing the threshold signal level with the RF signal level and determining whether a drop in the RF signal level with respect to the threshold level has occurred.

14. The system of claim 11, wherein the RF detector is tapped to the output primary line.

15. The system of claim 1, wherein the output primary line and the output secondary line are connected to an output of an RF system and the input primary line and the input secondary line are connected to an input of the RF system.

16. A method of switching RF signals comprising:
    setting a threshold signal level;
    detecting an RF signal level at an output of an RF circuit, said RF circuit connected to first and second switching devices, each said switching device having a switching state;
    comparing the RF signal level with the threshold signal level;
    changing the state of the first and second switching devices in response to the RF signal level dropping below the threshold level, whereby operation is maintained during a device failure;
    connecting an output primary line to a first load via the first switch; and
    connecting an output secondary line to an output common line via the second switch.

17. The method of claim 16, further comprising:
    changing the state of a third switch and a fourth switch when the RF signal level drops below the threshold level.

18. A method of switching RF signals comprising:
    setting a threshold signal level;
    detecting an RF signal level;

comparing the RF signal level with the threshold signal level;
changing a state of a first switch and a second switch when the RF signal level drops below the threshold level;
changing the state of a third switch and a fourth switch when the RF signal level drops below the threshold level;
connecting an input primary line to a load via the third switch; and
connecting an input secondary line to an input common line via the fourth switch.

19. A method of switching RF signals comprising:
setting a threshold signal level;
detecting an RF signal level;
comparing the RF signal level with the threshold signal level;
changing a state of a first switch and a second switch when the RF signal level drops below the threshold level;
changing the state of a third switch and a fourth switch when the RF signal level drops below the threshold level;
connecting an input primary line to an input common line via the third switch; and
connecting an input secondary line to a load via the fourth switch.

20. An RF signal switching system, comprising:
an output common line;
an output primary line;
an output secondary line;
a first switch means for interconnecting the output primary line with the output common line when the first switch means is in a first switching state, and for interconnecting the output primary line with a first load when the first switch means is in a second switching state; and
a second switch means for interconnecting the output secondary line with a second load when the second switch means is in a first switching state, and for interconnecting the output secondary line with the output common line when the second switch means is in a second switching state.

21. A method of switching RF signals comprising:
setting a threshold signal level;
detecting an RF signal level at an output of an RF circuit, said RF circuit connected to first and second switching devices, each said switching device having a switching state;
comparing the RF signal level with the threshold signal level;
changing the state of the first and second switching devices in response to the RF signal level dropping below the threshold level, whereby operation is maintained during a device failure;
connecting an output primary line to an output common line via the first switch; and
connecting an output secondary line to a second load via the second switch.

* * * * *

UNITED STATES PATENT AND TRADEMARK OFFICE
CERTIFICATE OF CORRECTION

| | |
|---|---|
| PATENT NO. | : 7,043,236 B2 |
| APPLICATION NO. | : 10/158075 |
| DATED | : May 9, 2006 |
| INVENTOR(S) | : Jay Lee |

It is certified that error appears in the above-identified patent and that said Letters Patent is hereby corrected as shown below:

ON THE TITLE PAGE:

[73] Assignee

"PCT Technologies, Inc., Ontario (CA)" should read --PCI Technologies, Inc., Ontario (CA)--.

Signed and Sealed this

Eighth Day of August, 2006

JON W. DUDAS
*Director of the United States Patent and Trademark Office*